(12) United States Patent
Müller et al.

(10) Patent No.: US 7,309,380 B2
(45) Date of Patent: Dec. 18, 2007

(54) GAS STORAGE SYSTEM

(75) Inventors: Ulrich Müller, Neustadt (DE); Michael Hesse, Worms (DE); Reinhard Heβ, Ellerstadt (DE); Rainer Senk, Ludwigshafen (DE); Markus Hölzle, Kirchheim (DE); Omar M. Yaghi, Ann Arbor, MI (US)

(73) Assignees: BASF Aktiengesellschaft, Ludwigshafen (DE); The Regents of the University of Michigan, Ann Arbor, MI (US)

( * ) Notice: Subject to any disclaimer, the term of this patent is extended or adjusted under 35 U.S.C. 154(b) by 587 days.

(21) Appl. No.: 10/608,146

(22) Filed: Jun. 30, 2003

(65) Prior Publication Data

US 2004/0265670 A1   Dec. 30, 2004

(51) Int. Cl.
*H01M 8/04* (2006.01)
*F17C 11/00* (2006.01)

(52) U.S. Cl. .......................... 95/141; 429/12; 502/526

(58) Field of Classification Search .................. 95/90, 95/116, 141; 96/108; 206/0.7; 429/12, 429/34; 502/526
See application file for complete search history.

(56) References Cited

U.S. PATENT DOCUMENTS

| | | | | |
|---|---|---|---|---|
| 4,609,038 | A | * | 9/1986 | Ishikawa et al. ........ 165/104.12 |
| 5,648,508 | A | * | 7/1997 | Yaghi ............................ 556/9 |
| 5,862,796 | A | | 1/1999 | Seki et al. |
| 5,998,647 | A | | 12/1999 | Seki et al. |
| 6,015,041 | A | | 1/2000 | Heung |
| 6,432,176 | B1 | * | 8/2002 | Klos et al. ................. 96/117.5 |
| 6,491,740 | B1 | * | 12/2002 | Wang et al. ................... 95/90 |
| 6,585,111 | B1 | | 7/2003 | Shervington et al. |
| 6,617,467 | B1 | | 9/2003 | Mueller et al. |
| 6,624,318 | B1 | | 9/2003 | Müller et al. |
| 6,929,679 | B2 | * | 8/2005 | Muller et al. ................... 95/90 |
| 2002/0096048 | A1 | * | 7/2002 | Cooper et al. ................ 95/116 |
| 2003/0004364 | A1 | | 1/2003 | Yaghi et al. |
| 2003/0078311 | A1 | | 4/2003 | Muller et al. |
| 2003/0148165 | A1 | | 8/2003 | Muller et al. |
| 2003/0222023 | A1 | | 12/2003 | Mueller et al. |
| 2004/0081611 | A1 | | 4/2004 | Muller et al. |
| 2004/0097724 | A1 | | 5/2004 | Muller et al. |
| 2004/0265670 | A1 | | 12/2004 | Muller et al. |
| 2006/0252641 | A1 | * | 11/2006 | Yaghi et al. ................. 502/401 |

FOREIGN PATENT DOCUMENTS

| | | |
|---|---|---|
| DE | 197 04 968 A1 | 7/1998 |
| DE | 202 10 139 | 6/2003 |
| DE | 202 10 139 U1 | 6/2003 |
| EP | 0 727 608 | 8/1996 |
| EP | 0 727 608 A2 | 8/1996 |
| EP | 0 790 253 | 8/1997 |
| EP | 1 072 839 A2 | 1/2001 |
| JP | 09227572 A * | 9/1997 |
| WO | WO 01/27521 A1 | 4/2001 |
| WO | WO 02/070526 | 9/2002 |
| WO | WO 02/088148 | 11/2002 |
| WO | WO 02/088148 A1 | 11/2002 |

OTHER PUBLICATIONS

S. Hynek, et al., Int. J. Hydrogen Energy, vol. 22, No. 6, pp. 601-610, "Hydrogen Storage by Carbon Sorption", 1997.
J. A. Kerres, Journal of Membrane Science, vol. 185, pp. 3-27, "Development of Ionomer Membranes for Fuel Cells", 2001.
G. Marsh, Materials Today, vol. 4, pp. 20-24, "Fuel Cell Materials", 2001.
R. T. Yang, Carbon, vol. 38, pp. 623-641, "Hydrogen Storage by Alkali-Doped Carbon Nanotubes-Revisited", 2000.
C. Liu, et al., Science, vol. 286, pp. 1127-1129, "Hydrogen Storage in Single-Walled Carbon Nanotubes at Room Temperature", Nov. 5, 1999.
M. O'Keeffe, et al., Journal of Solid State Chemistry, vol. 152, pp. 3-20, "Frameworks for Extended Solids: Geometrical Design Principles", 2000.
H. Li, et al., Nature, vol. 402, p. 276, "Design and Synthesis of an Exceptionally Stable and Highly Porous Metal-Organic Framework", 1999.
M. Eddaoudi, et al., Topics in Catalysis, vol. 9, pp. 105-111, "Design and Synthesis of Metal-Carboxylate Frameworks with Permanent Microporosity", 1999.
B. Chen, et al., Science, vol. 291, pp. 1021-1023, "Interwoven Metal-Organic Framework on a Periodic Minimal Surface With Extra-Large Pores", Feb. 9, 2001.
M. Eddaoudi, et al., Science, vol. 295, pp. 469-472, "Systematic Design of Pore Size and Functionality in Isoreticular MOFs and Their Application in Methane Storage", Jan. 18, 2002.
J. Am. Chem. Soc., vol. 123, No. 34, p. 8241, "Assembly of Metal-Organic Frameworks", 2001.
O. M. Yaghi, et all., Accounts of Chemical Research, vol. 31, No. 8, pp. 474-484, "Synthetic Strategies, Structure Patterns, and Emerging Properties in the Chemistry of Modular Porous Solids", 1998.
M. Eddaoudi, et al., Accounts of Chemical Research, vol. 34, No. 4, pp. 319-330, "Modular Chemistry: Secondary Building Units as a Basis for the Design of Highly Porous and Robust Metal-Organic Carboxylate Frameworks", 2001.
U.S. Appl. No. 10/983,629, filed Nov. 9, 2004, Hesse et al.
U.S. Appl. No. 10/580,407, filed May 24, 2006, Mueller et al.

* cited by examiner

*Primary Examiner*—Frank M. Lawrence
(74) *Attorney, Agent, or Firm*—Oblon, Spivak, McClelland, Maier & Neustadt, P.C.

(57) ABSTRACT

A container for uptaking, or storing, or releasing, or uptaking and storing, or uptaking and releasing, or storing and releasing, or uptaking, storing and releasing at least one gas, comprising a metal-organic framework material comprising pores and at least one metal ion and at least one at least bidentate organic compound which is bound to said metal ion, as well as to a fuel cell comprising said container, and to a method of using said container or said fuel cell for supplying power to power plants, cars, trucks, busses, cell phones, and laptops.

28 Claims, No Drawings

GAS STORAGE SYSTEM

The present invention relates to the technical field of storing gas including hydrogen and hydrocarbons, preferably hydrocarbons and more preferably methane, in particular to the fuel cell technology. Particularly, the present invention relates to a container for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion. According to one embodiment of the present invention, the aforementioned container has a non-cylindrical geometry.

Fuel cell technology is regarded as one of the core technologies of the 21$^{st}$ century, e.g. in relation to stationary applications, such as power plants, mobile applications such as cars, busses and trucks and portable applications, such as cellular phones and laptops and in so called APUs, such as the power supply in power plants. The reason therefor lies in the increased efficiency of fuel cells compared to normal combustion engines. Furthermore, the fuel cell produces significantly less emissions. An overview of the current developments in fuel cell technology may be found in Hynek et al. "Int. J. Hydrogen Energy", 22, no. 6, pp. 601-610 (1997), J. A. Kerres "Journal of Membrane Science", 185, 2001, p. 3-27 and a further review article by G. March in "Materials Today", 4, No.2 (2001), p. 20-24.

The use of metallo-organic complexes for storing gaseous C1 to C4 hydrocarbons is disclosed in EP-A 0 727 608. However, the complexes disclosed therein are difficult to synthesize. Furthermore, their storing capacity is low, if not too low to be industrially applicable.

Another attempt to provide materials useful for storing gases is the use of alkali-doped or undoped carbon nanotubes. An overview of the present status of research regarding this approach may be found in Yang, "Carbon" 38 (2000), pp. 623-641 and Cheng et al. "Science" 286, pp. 1127-1129.

Specific materials suitable for storing gases are disclosed in WO 02/088148. It is described that specific metallo-organic framework materials, so-called isoreticular metallo-organic framework materials, which are also disclosed in the present invention are especially suitable for storing methane. However, WO 02/088148 relates only to the capability of said framework materials for methane storage and values for their capacity for methane storage. As far as container comprising these isoreticular metallo-organic framework material is concerned, no specific geometry is disclosed.

U.S. patent application Ser. No. 10/061,147 filed Feb. 1, 2002, now U.S. Pat. No. 6,929,679, by the inventors of the present application discloses a method for uptaking, storing, and releasing gases wherein metallo-organic framework materials are used. In this context, a device and a fuel cell are disclosed comprising these metallo-organic framework materials. The described device includes, e.g., a container accomodating the metallo-organic framework material, an entrance/exit opening for allowing the at least one gas to enter or exit the device, and a gas-tight maintaining mechanism capable of maintaining the gas under pressure inside the container. However, neither specific containers nor container materials nor specific container geometries nor specific pressure ranges under which the gases are stored are disclosed.

In view of the above recited prior art, an object of the present invention is to provide a container comprising metallo-organic framework materials which is capable of uptaking and/or storing and/or releasing a gas such as a noble gas, carbon monoxide, carbon dioxide, nitrogen, a hydrocarbon, hydrogen, or a compound generating and/or delivering theses gases, preferably a hydrocarbon gas such as propane, ethane, or methane, or hydrogen, and more preferably methane, under a certain pressure.

This object is solved by a container for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from greater than 45 to 750 bar inside the container, said container further comprising a metallo-organic framework material comprising pores and at least one metal ion and at least one at least bidentate organic compound which is bound to said metal ion.

The present invention further relates to a storage system comprising a container for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion.

The present invention still further relates to a fuel cell, comprising at least one container for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion, and further relates to a method of using this fuel cell for supplying power to stationary and/or mobile and/or mobile portable application such as power plants, cars, trucks, busses, cordless tolls, cell phones, and laptops.

The present invention still further relates to a method of uptaking, or storing, or releasing, or uptaking and storing, or uptaking and releasing, or storing and releasing, or uptaking, storing and releasing at least one gas wherein the at least one gas is uptaken, or stored, or released, or uptaken and stored, or uptaken and released, or stored and released, or uptaken and stored and released by a metallo-organic framework material comprising pores and at least one metal ion and at least one at least bidentate organic compound which is preferably coordinately bound to said metal ion, wherein the metallo-organic framework material comprising pores is comprised in a container comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from greater than 45 to 750 bar inside the container The present invention further relates to a method of using a metallo-organic framework material comprising pores and at least one metal ion and at least one at least bidentate organic compound which is preferably coordinately bound to said metal ion, for uptakaking, or storing, or releasing, or uptaking and storing, or uptaking and releasing, or storing and releasing, or uptaking, storing and releasing at least one gas in stationary, mobile, or mobile portable applications, said applications comprising a container comprising said metallo-organic framework material comprising pores, said container further comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, wherein these applications are preferably power plants, cars, trucks, busses, cordless tools, cell phones, and laptops.

As far as the container as such is concerned, the pressure under which the at least one gas is stored is preferably in the range of from greater than 45 to 300 bar, more preferably in the range of from greater than 45 to 150 bar, even more preferably in the range of from greater than 50 to 150 bar, especially preferably in the range of from 50 to 100 bar and most preferably in the range of from 50 to 80 bar.

As to a storage system or a fuel cell comprising the container, the pressure under which the at least one gas is stored is preferably in the range of from 1 to 300 bar, more preferably in the range of from 1 to 200 bar, more preferably in the range of from greater than 45 to 200 bar, more preferably in the range of from greater than 45 to 150 bar, even more preferably in the range of from greater than 50 to 150 bar, especially preferably in the range of from 50 to 100 bar and most preferably in the range of from 50 to 80 bar.

The volume of the container may be freely chosen and adapted to the specific needs of the respective application for which the container is used.

If the container is used, for example, in a fuel cell of a passenger car, the volume of the container is preferably smaller than or equal to 300 l, preferably smaller than or equal to 250 l, more preferably smaller than or equal to 200 l, more preferably smaller than or equal to 150 l, more preferably smaller than or equal to 100 l.

If the container is used, for example, in a fuel cell of a truck, the volume of the container is preferably smaller than or equal to 500 l, preferably smaller than or equal to 450 l, more preferably smaller than or equal to 400 l, more preferably smaller than or equal to 350 l, more preferably smaller than or equal to 300 l.

If the container is used, for example, in a storage system which is used, for example, in a gas station, the volume of the container may be within the aforementioned ranges, but may as well exceed the aforementioned ranges.

The geometry of a container, known in the art, comprising at least one gas under pressure, especially in the technical field of fuel cells, is generally restricted to cylindrical geometry due to stability considerations. Unlike those containers, the inventive containers, comprising the above-mentioned metallo-organic framework, allow for storing a higher amount of the at least one gas under a given pressure or, vice versa, the same amount of at least one gas, preferably a hydrocarbon, most preferably methane, under a considerably lower pressure.

An advantage of those containers is that their geometry generally may be freely chosen, and especially non-cylindrical geometries are possible.

Therefore, according to another preferred embodiment, the present invention relates to a container having a non-cylindrical geometry for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion.

As to the container having a non-cylindrical geometry and a storage system and a fuel cell comprising at least one container having a non-cylindrical geometry, the pressure under which the at least one gas is stored is preferably in the range of from 1 to 300 bar, more preferably in the range of from 1 to 200 bar, more preferably in the range of from 1 to 150 bar, more preferably in the range of from 1 to 80 bar, more preferably in the range of greater than 45 to 80 bar and most preferably in the range of from 50 to 80 bar.

According to yet another preferred embodiment, the present invention also relates to a storage system comprising a container having non-cylindrical geometry as mentioned above.

According to still another preferred embodiment, the present invention also relates to a fuel cell comprising a container having non-cylindrical geometry as mentioned above.

A serious drawback of applications in which a container was used which comprised at least one gas under high pressure and whose geometry was restricted to a cylindrical shape, was that a considerable waste of valuable space generally had to be accepted or additional space had to be alloted making the respective application larger than necessary. One example is the use of fuel cells in cars wherein, using containers of restricted geometry, a considerable portion, if not the complete, rear trunk had to be taken up for housing the container or a plurality of containers.

This major drawback may be overcome using the containers with non-cylindrical geometry according to the present invention which comprise the at least one gas preferably under pressures of up to 150 bar, most preferably of from 50 to 80 bar. Non-cylindrical containers, and consequently storage systems and/or fuel cells are provided whose geometries may be more or less freely adapted to the respective applications. In cars, for example, cavities which are generally useless like cavities in a transmission tunnel may be equipped with a container or part of a container or a fuel cell or part of a fuel cell thus saving valuable storage space.

As to the inventive container, the present invention also relates to a method of using a fuel cell comprising said container for supplying power to stationary, mobile, and mobile portable applications.

Among these applications, power plants, ships, planes, cars, trucks, busses, motorbikes, cordless tools in general, cell phones, laptops, personal computers and the like may be mentioned.

The present invention therefore relates to a method of using a fuel cell comprising the aforementioned container for supplying power to power plants, cars, trucks, busses, cordless tools, cell phones, and laptops.

According to another embodiment, the present invention also relates to a method of transferring at least one gas from a storage system to a fuel cell, said storage system comprising at least one container having a non-cylindrical geometry for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion. According to yet another preferred embodiment of the present invention, the fuel cell the at least one gas is transferred into comprises at least one container having a non-cylindrical geometry for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container, said container further comprising a metallo-organic framework material comprising pores and at least one metal ion and at least one at least bidentate organic compound which is bound to said metal ion.

Moreover, the present invention relates to a method of uptaking, or storing, or releasing, or uptaking and storing, or uptaking and releasing, or storing and releasing, or uptaking, storing and releasing at least one gas wherein the at least one gas is uptaken, or stored, or released, or uptaken and stored, or uptaken and released, or stored and released, or uptaken and stored and released by a metallo-organic framework material comprising pores and at least one metal ion and at least one at least bidentate organic compound which is preferably coordinately bound to said metal ion wherein the metallo-organic framework material comprising pores is comprised in at least one container having non-cylindrical geometry comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container.

According to another aspect, the present invention relates to a method of using a metallo-organic framework material comprising pores and at least one metal ion and at least one at least bidentate organic compound which is preferably coordinately bound to said metal ion, for uptaking, or storing, or releasing, or uptaking and storing, or uptaking and releasing, or storing and releasing, or uptaking, storing and releasing at least one gas in stationary, mobile, or mobile portable applications, said applications comprising a container having a non-cylindrical geometry comprising said metallo-organic framework material comprising pores, said container further comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 1 to 750 bar inside the container.

Among these applications, power plants, ships, planes, cars, trucks, busses, motorbikes, cordless tools in general, cell phones, laptops, personal computers and the like may be mentioned.

As material the container according to the present invention is manufactured from, generally each material may be used which is stable when exposed to the pressures given above and which is gas-tight under these pressures. Therefore, different materials may be chosen for different gases to be uptaken and/or stored and/or released. Examples for materials are metals like, for example, stainless steel or aluminum, synthetic material, composite material, fiber reinforced synthetic material, fiber reinforced composite material, carbon fiber composite materials or mixtures of two or more thereof like, for example, carbon fiber composite material laminated with aluminum. Preferred are, among others, materials having low weight and/or low density.

A container according to the present invention may have one wall, a double wall, a triple wall or even more than three walls. If the container has more than one wall and is, for example, double-walled, there may be at least one insulating layer between two adjacent walls. As insulating layer, a vacuum layer or a layer comprising, for example, glass wool, may be used. As insulating layer, also a metal foil covered with at least one layer of glass wool may be used. As insulating layer, also the combination of one or more metal foils at least one of which is covered with glass wool with vacuum is possible.

Containers, storage systems and/or fuel cells according to the invention may be used once or several times, according to the application they are used in. According to one embodiment, the at least one gas may be uptaken, stored and released whereafter the container is disposed. According to another embodiment of the present invention, the container from which the uptaken and stored gas is at least partially released is at least partially refilled again with the same or another gas or the same gas mixture or another gas mixture.

According to a further embodiment, the present invention relates to a method of transferring at least one gas from a first container to a second container wherein at least one container is a container according to the present invention. According to this embodiment, the first container may contain at least one gas, for example hydrogen or a hydrocarbon, most preferably methane, wherein said first container is a container according to the invention. The at least one gas, stored in the first container, is then transferred to a second container which may or may not be a container according to the present invention. Moreover, the first container comprising the at least one gas may be a container known in the art, for example a cylindrical container without metallo-organic framework material comprising pores and at least one metal ion and at least one at least bidentate organic compound which is bound to said metal ion. From this container, the at least one gas is transferred to a second container according to the invention, having, for example, non-cylindrical geometry. According to a third aspect of this embodiment, the first container is a container according to the present invention, for example a container which represents or which is part of a storage system, and the second container is a container according to the present invention as well, for example a container having, for example, non-cylindrical geometry which is part of a fuel cell.

Therefore, according to an especially preferred aspect of this embodiment, the present invention relates to transferring at least one gas like hydrogen or a hydrocarbon like methane from a storage system to a fuel cell wherein either the storage system or the fuel cell or the storage system as well as the fuel cell comprise a container of the present invention. The storage system may be, for example, part of a gas station in which at least one gas like hydrogen or methane is stored. From this storage system the at least one gas may be transferred to another storage system comprising a container or preferably to a fuel cell comprising a container wherein this fuel cell is, for example, part of a passenger car, a truck, a motorbike or the like or another mobile application.

According to another especially preferred aspect of this embodiment, the present invention relates to transferring at least one gas like hydrogen or a hydrocarbon like methane from a first storage system to a second storage system wherein the first storage system is part of, for example, a truck delivering the at least one gas, and the second storage system is part of a gas station to which the at least one gas is delivered. Either the first storage system or the second storage system or the first storage system as well as the second storage system comprise at least one container according to the present invention.

The metallo-organic framework materials as such are described, for example, in. U.S. Pat. No. 5,648,508, EP-A-0 709 253, M. O'Keeffe et al., *J. Sol. State Chem.*, 152 (2000) p. 3-20, H. Li et al., *Nature* 402 (1999) p. 276 seq., M. Eddaoudi et al., *Topics in Catalysis* 9 (1999) p. 105-111, B. Chen et al., *Science* 291 (2001) p. 1021-23. An inexpensive way for the preparation of said materials is the subject of DE 10111230.0. Certain materials and ways for their preparation are disclosed in WO 02/088148. The content of these publications, to which reference is made herein, is fully incorporated in the content of the present application.

The metallo-organic framework materials, as used in the present invention, comprise pores, particularly micro- and/or mesopores. Micropores are defined as being pores having a diameter of 2 nm or below and mesopores as being pores having a diameter in the range of above 2 nm to 50 nm, respectively, according to the definition given in *Pure Applied Chem.* 45, p. 71 seq., particularly on p. 79 (1976). The presence of the micro- and/or mesopores can be monitored by sorption measurements for determining the capacity of the metallo-organic framework materials to take up nitrogen at 77 K according to DIN 66131 and/or DIN 66134.

For example, a type-I-form of the isothermal curve indicates the presence of micropores [see, for example, paragraph 4 of M. Eddaoudi et al., *Topics in Catalysis* 9 (1999)]. In a preferred embodiment, the specific surface area, as calculated according to the Langmuir model (DIN 66131, 66134) preferably is above 5 $m^2/g$, further preferred above 10 $m^2/g$, more preferably above 50 $m^2/g$, particularly preferred above 500 $m^2/g$ and may increase into the region of above 4,000 $m^2/g$.

As to the metal component within the framework material that is to be used according to the present invention, particularly to be mentioned are the metal ions of the main group elements and of the subgroup elements of the periodic system of the elements, namely of the groups Ia, IIa, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co. As to the metal ions of these elements, particular reference is made to: $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$.

Particularly preferred metal ions are $Co^{2+}$ and $Zn^{2+}$.

With regard to the preferred metal ions and further details regarding the same, particular reference is made to: EP-A 0 790 253, particularly to p. 10, 1.8-30, section "The Metal Ions", which section is incorporated herein by reference.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble and they may be used as starting material either in form of a powder or as a shaped body or as any combination thereof.

As to the at least bidentate organic compound, which is capable to coordinate with the metal ion, in principle all compounds can be used which are suitable for this purpose and which fulfill the above requirements of being at least bidentate. Said organic compound must have at least two centers, which are capable to coordinate with the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, aromatic, at least one hetero atom comprising aromatic di-, tri- and tetracarboxylic acids, which have one or more nuclei.

A preferred ligand is 1,3,5-benzene tricarboxylate (BCT). Further preferred ligands are ADC (acetylene dicarboxylate), NDC (naphtalen dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more mono-dentate ligand(s), which is/are preferably selected from the following mono-dentate substances and/or derivatives thereof:
a. alkyl amines and their corresponding alkyl ammonium salts, containing linear, branched, or cyclic aliphatic groups, having from 1 to 20 carbon atoms (and their corresponding ammonium salts);
b. aryl amines and their corresponding aryl ammonium salts having from 1 to 5 phenyl rings;
c. alkyl phosphonium salts, containing linear, branched, or cyclic aliphatic groups, having from 1 to 20 carbon atoms;
d. aryl phosphonium salts, having from 1 to 5 phenyl rings;
e. alkyl organic acids and the corresponding alkyl organic anions (and salts) containing linear, branched, or cyclic aliphatic groups, having from 1 to 20 carbon atoms;
f. aryl organic acids and their corresponding aryl organic anions and salts, having from 1 to 5 phenyl rings;
g. aliphatic alcohols, containing linear, branched, or cyclic aliphatic groups, having from 1 to 20 carbon atoms;
h. aryl alcohols having from 1 to 5 phenyl rings;
i. inorganic anions from the group consisting of: sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions,
j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the mono-dentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions and at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 101 11230.0.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metallo-organic framework can be adjusted by selecting suitable organic ligands and/or bidentate compounds (=linkers). Generally, the larger the linker, the larger the pore size. Any pore size that is still supported by a the metallo-organic framework in the absence of a host and at temperatures of at least 200° C. is conceivable. Pore sizes ranging from 0.2 nm to 30 nm are preferred, with pore sizes ranging from 0.3 nm to 3 nm being particularly preferred.

In the following, examples of metallo-organic framework materials (MOFs) are given to illustrate the general concept given above. These specific examples, however, are not meant to limit the generality and scope of the present application.

By way of example, a list of metallo-organic framework materials already synthesized and characterized is given below. This also includes novel isoreticular metal organic framework materials (IR-MOFs), which may be used in the context of the present application. Such materials having the same framework topology while displaying different pore sizes and crystal densities are described, for example in M. Eddouadi et al., *Science* 295 (2002) 469, whose respective content is incorporated into the present application by reference The solvents used are of particular importance for the synthesis of these materials and are therefore mentioned in the table. The values for the cell parameters (angles alpha, beta and gamma as well as the spacings a, b and c, given in Angstrom) have been obtained by X-ray diffraction and represent the space group given in the table as well.

| MOF-n | Ingredients molar ratios M + L | Solvents | α | β | γ | a | b | c | Space Group |
|---|---|---|---|---|---|---|---|---|---|
| MOF-0 | $Zn(NO_3)_2 \cdot 6H_2O$ $H_3(BTC)$ | ethanol | 90 | 90 | 120 | 16.711 | 16.711 | 14.189 | P6(3)/Mcm |
| MOF-2 | $Zn(NO_3)_2 \cdot 6H_2O$ (0.246 mmol) $H_2(BDC)$ 0.241 mmol) | DMF toluene | 90 | 102.8 | 90 | 6.718 | 15.49 | 12.43 | P2(1)/n |
| MOF-3 | $Zn(NO_3)_2 \cdot 6H_2O$ (1.89 mmol) $H_2(BDC)$ (1.93 mmol) | DMF MeOH | 99.72 | 111.11 | 108.4 | 9.726 | 9.911 | 10.45 | P-1 |

-continued

| MOF-n | Ingredients molar ratios M + L | Solvents | α | β | γ | a | b | c | Space Group |
|---|---|---|---|---|---|---|---|---|---|
| MOF-4 | Zn(NO$_3$)$_2$ · 6H$_2$O (1.00 mmol) H$_3$(BTC) (0.5 mmol) | ethanol | 90 | 90 | 90 | 14.728 | 14.728 | 14.728 | P2(1)3 |
| MOF-5 | Zn(NO$_3$)$_2$ · 6H$_2$O (2.22 mmol) H$_2$(BDC) (2.17 mmol) | DMF chlorobenzene | 90 | 90 | 90 | 25.669 | 25.669 | 25.669 | Fm-3m |
| MOF-38 | Zn(NO$_3$)$_2$ · 6H$_2$O (0.27 mmol) H$_3$(BTC) (0.15 mmol) | DMF chlorobenzene | 90 | 90 | 90 | 20.657 | 20.657 | 17.84 | I4cm |
| MOF-31 Zn(ADC)$_2$ | Zn(NO$_3$)$_2$ · 6H$_2$O 0.4 mmol H$_2$(ADC) 0.8 mmol | ethanol | 90 | 90 | 90 | 10.821 | 10.821 | 10.821 | Pn(−3)m |
| MOF-12 Zn$_2$(ATC) | Zn(NO$_3$)$_2$ · 6H$_2$O 0.3 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$ · 6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$ · 6H$_2$O 0.2 mmol H$_2$NDC 0.2 mmol | DEF chlorobenzene | 72.38 | 83.16 | 84.33 | 9.952 | 11.576 | 15.556 | P-1 |
| MOF-8 Tb$_2$ (ADC) | Tb(NO$_3$)$_3$ · 5H$_2$O 0.10 mmol H$_2$ADC 0.20 mmol | DMSO MeOH | 90 | 115.7 | 90 | 19.83 | 9.822 | 19.183 | C2/c |
| MOF-9 Tb$_2$ (ADC) | Tb(NO$_3$)$_3$ · 5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$ · 5H$_2$O 0.30 mmol H$_2$ (BDC) 0.30 mmol | DMF MeOH | 90 | 91.28 | 90 | 17.599 | 19.996 | 10.545 | P21/c |
| MOF-7 | Tb(NO$_3$)$_3$ · 5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$ · 6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$ · 6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$ · 2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/mmc |
| MOF-14 Cu$_3$ (BTB) | Cu(NO$_3$)$_2$ · 2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$ · 4H$_2$O 0.24 mmol H$_4$ATC 0.10 mmol | H$_2$O NaOH | 90 | 90 | 90 | 13.468 | 13.468 | 13.468 | P(−4)3m |
| MOF-33 Zn$_2$ (ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$ · 6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |

-continued

| MOF-n | Ingredients molar ratios M + L | Solvents | α | β | γ | a | b | c | Space Group |
|---|---|---|---|---|---|---|---|---|---|
| MOF-36 Zn₂ (MTB) | Zn(NO₃)₂ · 4H₂O 0.20 mmol H₄MTB 0.04 mmol | H₂O DMF | 90 | 90 | 90 | 15.745 | 16.907 | 18.167 | Pbca |
| MOF-39 Zn₃O(HBTB) | Zn(NO₃)₂ 4H₂O 0.27 mmol H₃BTB 0.07 mmol | H₂O DMF EtOH | 90 | 90 | 90 | 17.158 | 21.591 | 25.308 | Pnma |
| NO305 | FeCl₂ · 4H₂O 5.03 mmol formic acid 86.90 mmol | DMF | 90 | 90 | 120 | 8.2692 | 8.2692 | 63.566 | R-3c |
| NO306A | FeCl₂ · 4H₂O 5.03 mmol formic acid 86.90 mmol | DEF | 90 | 90 | 90 | 9.9364 | 18.374 | 18.374 | Pbcn |
| NO29 MOF-0 like | Mn(Ac)₂ · 4H₂O 0.46 mmol H₃BTC 0.69 mmol | DMF | 120 | 90 | 90 | 14.16 | 33.521 | 33.521 | P-1 |
| BPR48 A2 | Zn(NO₃)₂ 6H₂O 0.012 mmol H₂BDC 0.012 mmol | DMSO toluene | 90 | 90 | 90 | 14.5 | 17.04 | 18.02 | Pbca |
| BPR69 B1 | Cd(NO₃)₂ 4H₂O 0.0212 mmol H₂BDC 0.0428 mmol | DMSO | 90 | 98.76 | 90 | 14.16 | 15.72 | 17.66 | Cc |
| BPR92 A2 | Co(NO₃)₂ · 6H₂O 0.018 mmol H₂BDC 0.018 mmol | NMP | 106.3 | 107.63 | 107.2 | 7.5308 | 10.942 | 11.025 | P1 |
| BPR95 C5 | Cd(NO₃)₂ 4H₂O 0.012 mmol H₂BDC 0.36 mmol | NMP | 90 | 112.8 | 90 | 14.460 | 11.085 | 15.829 | P2(1)/n |
| Cu C₆H₄O₆ | Cu(NO₃)₂ · 2.5H₂O 0.370 mmol H₂BDC(OH)₂ 0.37 mmol | DMF chlorobenzene | 90 | 105.29 | 90 | 15.259 | 14.816 | 14.13 | P2(1)/c |
| M(BTC) MOF-0like | Co(SO₄) H₂O 0.055 mmol H₃BTC 0.037 mmol | DMF | Same as MOF-0 | | | | | | |
| Tb(C₆H₄O₆) | Tb(NO₃)₃ · 5H₂O 0.370 mmol H₂(C₆H₄O₆) 0.56 mmol | DMF chlorobenzene | 104.6 | 107.9 | 97.147 | 10.491 | 10.981 | 12.541 | P-1 |
| Zn (C₂O₄) | ZnCl₂ 0.370 mmol oxalic acid 0.37 mmol | DMF chlorobenzene | 90 | 120 | 90 | 9.4168 | 9.4168 | 8.464 | P(-3)1m |
| Co(CHO) | Co(NO₃)₂ · 5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂ · 4H₂O 0.185 mmol formic acid 0.185 mmol | DMF | 90 | 120 | 90 | 8.5168 | 8.5168 | 22.674 | R-3c |
| Cu(C₃H₂O₄) | Cu(NO₃)₂ · 2.5H₂O 0.043 mmol malonic acid 0.192 mmol | DMF | 90 | 90 | 90 | 8.366 | 8.366 | 11.919 | P43 |
| Zn₆ (NDC)₅ MOF-48 | Zn(NO₃)₂ · 6H₂O 0.097 mmol 14 NDC 0.069 mmol | DMF chlorobenzene H₂O₂ | 90 | 95.902 | 90 | 19.504 | 16.482 | 14.64 | C2/m |
| MOF-47 | Zn(NO₃)₂ 6H₂O 0.185 mmol H₂(BDC[CH₃]₄) 0.185 mmol | DMF chlorobenzene H₂O₂ | 90 | 92.55 | 90 | 11.303 | 16.029 | 17.535 | P2(1)/c |

-continued

| MOF-n | Ingredients molar ratios M + L | Solvents | α | β | γ | a | b | c | Space Group |
|---|---|---|---|---|---|---|---|---|---|
| MO25 | Cu(NO$_3$)$_2$ · 2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$ · 2.5H$_2$O 0.084 mmol thiophene dicarboxylic 0.085 mmol | DEF | 90 | 113.6 | 90 | 15.4747 | 14.514 | 14.032 | P2(1)/c |
| ClBDC1 | Cu(NO$_3$)$_2$ · 2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$ · 2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH base added | 90 | 90 | 90 | 26.572 | 26.572 | 26.572 | Fm-3m |
| MOF-j | Co(CH$_3$CO$_2$)$_2$ · 4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$ · 6H$_2$O H$_3$(BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$ · 6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| AS54-3 | FeBr$_2$ 0.927 BPDC 0.927 mmol | DMF anhydr. n-propanol | 90 | 109.98 | 90 | 12.019 | 15.286 | 14.399 | C2 |
| AS61-4 | FeBr$_2$ 0.927 mmol m-BDC 0.927 mmol | pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | Zn(NO$_3$)$_2$ · 6H$_2$O 0.37 mmol H$_2$(ADC) 0.36 mmol | DMF chlorobenzene | 90 | 99.85 | 90 | 16.764 | 9.349 | 9.635 | C2/c |
| MOF-12 Zn$_2$ (ATC) | Zn(NO$_3$)$_2$ · 6H$_2$O 0.30 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$ · 6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$ · 6H$_2$O 0.20 mmol H$_2$NDC 0.20 mmol | DEF chlorobenzene | 72.38 | 83.16 | 84.33 | 9.952 | 11.576 | 15.556 | P-1 |

| MOF-n | Ingredients molar ratios M + L | Solvents | α | β | γ | a | b | c | Space Group |
|---|---|---|---|---|---|---|---|---|---|
| Zn(NDC) (DMSO) | Zn(NO₃)₂ · 6H₂O H₂NDC | DMSO | 68.08 | 75.33 | 88.31 | 8.631 | 10.207 | 13.114 | P-1 |
| Zn(NDC) | Zn(NO₃)₂ · 6H₂O H₂NDC | | 90 | 99.2 | 90 | 19.289 | 17.628 | 15.052 | C2/c |
| Zn(HPDC) | Zn(NO₃)₂ · 4H₂O 0.23 mmol H₂(HPDC) 0.05 mmol | DMF H₂O | 107.9 | 105.06 | 94.4 | 8.326 | 12.085 | 13.767 | P-1 |
| Co(HPDC) | Co(NO₃)₂ · 6H₂O 0.21 mmol H₂ (HPDC) 0.06 mmol | DMF H₂O/ ethanol | 90 | 97.69 | 90 | 29.677 | 9.63 | 7.981 | C2/c |
| Zn₃(PDC)2.5 | Zn(NO₃)₂ · 4H₂0 0.17 mmol H₂(HPDC) 0.05 mmol | DMF/ ClBz H₂0/ TEA | 79.34 | 80.8 | 85.83 | 8.564 | 14.046 | 26.428 | P-1 |
| Cd₂ (TPDC)2 | Cd(NO₃)₂ · 4H₂O 0.06 mmol H₂(HPDC) 0.06 mmol | methanol/ CHP H₂O | 70.59 | 72.75 | 87.14 | 10.102 | 14.412 | 14.964 | P-1 |
| Tb(PDC)1.5 | Th(NO₃)₃ · 5H₂O 0.21 mmol H₂(PDC) 0.034 mmol | DMF H₂O/ ethanol | 109.8 | 103.61 | 100.14 | 9.829 | 12.11 | 14.628 | P-1 |
| ZnDBP | Zn(NO₃)₂ · 6H₂O 0.05 mmol dibenzylphosphate 0.10 mmol | MeOH | 90 | 93.67 | 90 | 9.254 | 10.762 | 27.93 | P2/n |
| Zn₃(BPDC) | ZnBr₂ 0.021 mmol 4,4'BPDC 0.005 mmol | DMF | 90 | 102.76 | 90 | 11.49 | 14.79 | 19.18 | P21/n |
| CdBDC | Cd(NO₃)₂ · 4H₂O 0.100 mmol H₂(BDC) 0.401 mmol | DMF Na₂SiO₃ (aq) | 90 | 95.85 | 90 | 11.2 | 11.11 | 16.71 | P21/n |
| Cd-mBDC | Cd(NO₃)₂ · 4H₂O 0.009 mmol H₂(mBDC) 0.018 mmol | DMF MeNH₂ | 90 | 101.1 | 90 | 13.69 | 18.25 | 14.91 | C2/c |
| Zn₄OBNDC | Zn(NO₃)₂ · 6H₂O 0.041 mmol BNDC | DEF MeNH₂ H₂O₂ | 90 | 90 | 90 | 22.35 | 26.05 | 59.56 | Fmmm |
| Eu(TCA) | Eu(NO₃)₃ · 6H₂O 0.14 mmol TCA 0.026 mmol | DMF chlorobenzene | 90 | 90 | 90 | 23.325 | 23.325 | 23.325 | Pm-3n |
| Th(TCA) | Th(NO₃)₃ · 6H₂O 0.069 mmol TCA 0.026 mmol | DMF chlorobenzene | 90 | 90 | 90 | 23.272 | 23.272 | 23.372 | Pm-3n |
| Formate | Ce(NO₃)₃ · 6H₂O 0.138 mmol Formaic acid 0.43 mmol | H₂O ethanol | 90 | 90 | 120 | 10.668 | 10.667 | 4.107 | R-3m |
| Formate | FeCl₂ · 4H₂O 5.03 mmol Formic acid 86.90 mmol | DMF | 90 | 90 | 120 | 8.2692 | 8.2692 | 63.566 | R-3c |
| Formate | FeCl₂ · 4H₂O 5.03 mmol Formic acid 86.90 mmol | DEF | 90 | 90 | 90 | 9.9364 | 18.374 | 18.374 | Pbcn |
| Formate | FeCl₂ · 4H₂O 5.03 mmol Formic acid 86.90 mmol | DEF | 90 | 90 | 90 | 8.335 | 8.335 | 13.34 | P-31c |
| NO330 | FeCl₂ · 4H₂O 0.50 mmol Formic acid 8.69 mmol | formamide | 90 | 90 | 90 | 8.7749 | 11.655 | 8.3297 | Pnna |
| NO332 | FeCl₂ · 4H₂O 0.50 mmol Formic acid 8.69 mmol | DIP | 90 | 90 | 90 | 10.0313 | 18.808 | 18.355 | Pbcn |

-continued

| MOF-n | Ingredients molar ratios M + L | Solvents | α | β | γ | a | b | c | Space Group |
|---|---|---|---|---|---|---|---|---|---|
| NO333 | FeCl$_2$ · 4H$_2$O 0.50 mmol Formic acid 8.69 mmol | DBF | 90 | 90 | 90 | 45.2754 | 23.861 | 12.441 | Cmcm |
| NO335 | FeCl$_2$ · 4H$_2$O 0.50 mmol Formic acid 8.69 mmol | CHF | 90 | 91.372 | 90 | 11.5964 | 10.187 | 14.945 | P21/n |
| NO336 | FeCl$_2$ · 4H$_2$O 0.50 mmol Formic acid 8.69 mmol | MFA | 90 | 90 | 90 | 11.7945 | 48.843 | 8.4136 | Pbcm |
| NO13 | Mn(Ac)$_2$ · 4H$_2$O 0.46 mmol Bezoic acid 0.92 mmol Bipyridine 0.46 mmol | ethanol | 90 | 90 | 90 | 18.66 | 11.762 | 9.418 | Pbcn |
| NO29 MOF-0 like | Mn(Ac)$_2$ · 4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$ · 4H$_2$O 0.46 mmol Hfac 0.92 mmol Bipyridine 0.46 mmol | ether | 90 | 95.32 | 90 | 9.572 | 17.162 | 14.041 | C2/c |
| BPR43G2 | Zn(NO$_3$)$_2$ · 6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$ · 6H$_2$O 0.012 mmol H$_2$BDC 0.012 mmol | DMSO toluene | 90 | 90 | 90 | 14.5 | 17.04 | 18.02 | Pbca |
| BPR49B1 | Zn(NO$_3$)$_2$ · 6H$_2$O 0.024 mmol H$_2$BDC 0.048 mmol | DMSO methanol | 90 | 91.172 | 90 | 33.181 | 9.824 | 17.884 | C2/c |
| BPR56E1 | Zn(NO$_3$)$_2$ · 6H$_2$O 0.012 mmol H$_2$BDC 0.024 mmol | DMSO n-propanol | 90 | 90.096 | 90 | 14.5873 | 14.153 | 17.183 | P2(1)/n |
| BPR68D10 | Zn(NO$_3$)$_2$ · 6H$_2$O 0.0016 mmol H$_3$BTC 0.0064 mmol | DMSO benzene | 90 | 95.316 | 90 | 10.0627 | 10.17 | 16.413 | P2(1)/c |
| BPR69B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$ 4H$_2$O 0.006 mmol H$_2$BDC 0.003 mmol | DMSO toluene | 90 | 92.324 | 90 | 8.7231 | 7.0568 | 18.438 | P2(1)/n |
| BPR76D5 | Zn(NO$_3$)$_2$ 6H$_2$O 0.0009 mmol H$_2$BzPDC 0.0036 mmol | DMSO | 90 | 104.17 | 90 | 14.4191 | 6.2599 | 7.0611 | Pc |
| BPR80B5 | Cd(NO$_3$)$_2$ · 4H$_2$O 0.018 mmol H$_2$BDC 0.036 mmol | DMF | 90 | 115.11 | 90 | 28.049 | 9.184 | 17.837 | C2/c |
| BPR80H5 | Cd(NO$_3$)$_2$ 4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$ 4H$_2$O 0.0068 mmol H$_2$BDC 0.202 mmol | DMF | 90 | 90 | 90 | 9.7721 | 21.142 | 27.77 | Fdd2 |

-continued

| MOF-n | Ingredients molar ratios M + L | Solvents | α | β | γ | a | b | c | Space Group |
|---|---|---|---|---|---|---|---|---|---|
| BPR86C3 | Cd(NO₃)₂ 6H₂O 0.0025 mmol H₂BDC 0.075 mmol | DMF | 90 | 90 | 90 | 18.3449 | 10.031 | 17.983 | Pca2(1) |
| BPR86H6 | Cd(NO₃)₂ · 6H₂O 0.010 mmol H₂BDC 0.010 mmol | DMF | 80.98 | 89.69 | 83.412 | 9.8752 | 10.263 | 15.362 | P-1 |
| BPR95A2 | Zn(NO₃)₂ 6H₂O 0.012 mmol H₂BDC 0.012 mmol | NMP | 90 | 102.9 | 90 | 7.4502 | 13.767 | 12.713 | P2(1)/c |
| CuC₆F₄O₄ | Cu(NO₃)₂ · 2.5H₂O 0.370 mmol H₂BDC(OH)₂ 0.37 mmol | DMF chlorobenzene | 90 | 98.834 | 90 | 10.9675 | 24.43 | 22.553 | P2(1)/n |
| Fe Formic | FeCl₂ · 4H₂O 0.370 mmol Formic acid 0.37 mmol | DMF | 90 | 91.543 | 90 | 11.495 | 9.963 | 14.48 | P2(1)/n |
| Mg Formic | Mg(NO₃)₂ · 6H₂O 0.370 mmol Formic acid 0.37 mmol | DMF | 90 | 91.359 | 90 | 11.383 | 9.932 | 14.656 | P2(1)/n |
| MgC₆H₄O₆ | Mg(NO₃)₂ · 6H₂O 0.370 mmol H₂BDC(OH)₂ 0.37 mmol | DMF | 90 | 96.624 | 90 | 17.245 | 9.943 | 9.273 | C2/c |
| Zn C₂H₄BDC MOF-38 | ZnCl₂ 0.44 mmol CBBDC 0.261 mmol | DMF | 90 | 94.714 | 90 | 7.3386 | 16.834 | 12.52 | P2(1)/n |
| MOF-49 | ZnCl₂ 0.44 mmol m-BDC 0.261 mmol | DMF CH3CN | 90 | 93.459 | 90 | 13.509 | 11.984 | 27.039 | P2/c |
| MOF-26 | Cu(NO₃)₂ · 5H₂O 0.084 mmol DCPE 0.085 mmol | DMF | 90 | 95.607 | 90 | 20.8797 | 16.017 | 26.176 | P2(1)/n |
| MOF-112 | Cu(NO₃)₂ · 2.5H₂O 0.084 mmol o-Br-m-BDC 0.085 mmol | DMF ethanol | 90 | 107.49 | 90 | 29.3241 | 21.297 | 18.069 | C2/c |
| MOF-109 | Cu(NO₃)₂ · 2.5H₂O 0.084 mmol KDB 0.085 mmol | DMF | 90 | 111.98 | 90 | 23.8801 | 16.834 | 18.389 | P2(1)/c |
| MOF-111 | Cu(NO₃)₂ · 2.5H₂O 0.084 mmol o-BrBDC 0.085 mmol | DMF ethanol | 90 | 102.16 | 90 | 10.6767 | 18.781 | 21.052 | C2/c |
| MOF-110 | Cu(NO₃)₂ · 2.5H₂O 0.084 mmol thiophene dicarboxylic 0.085 mmol | DMF | 90 | 90 | 120 | 20.0652 | 20.065 | 20.747 | R-3/m |
| MOF-107 | Cu(NO₃)₂ · 2.5H₂O 0.084 mmol thiophene dicarboxylic 0.085 mmol | DEF | 104.8 | 97.075 | 95.206 | 11.032 | 18.067 | 18.452 | P-1 |
| MOF-108 | Cu(NO₃)₂ · 2.5H₂O 0.084 mmol thiophene dicarboxylic 0.085 mmol | DBF/ methanol | 90 | 113.63 | 90 | 15.4747 | 14.514 | 14.032 | C2/c |
| MOF-102 | Cu(NO₃)₂ · 2.5H₂O 0.084 mmol H₂(BDCCl₂) 0.085 mmol | DMF | 91.63 | 106.24 | 112.01 | 9.3845 | 10.794 | 10.831 | P-1 |
| Clbdc1 | Cu(NO₃)₂ · 2.5H₂O 0.084 mmol H₂(BDCCl₂) 0.085 mmol | DEF | 90 | 105.56 | 90 | 14.911 | 15.622 | 18.413 | P-1 |

-continued

| MOF-n | Ingredients molar ratios M + L | Solvents | α | β | γ | a | b | c | Space Group |
|---|---|---|---|---|---|---|---|---|---|
| Cu(NMOP) | Cu(NO$_3$)$_2$ · 2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$ · 5H$_2$O 0.033 mmol H$_3$BTC 0.033 mmol | DMF | 90 | 106.02 | 90 | 18.6986 | 11.368 | 19.721 | |
| Zn$_3$(BTC)$_2$ | ZnCl$_2$ 0.033 mmol H$_3$BTC 0.033 mmol | DMF ethanol | 90 | 90 | 90 | 26.572 | 26.572 | 26.572 | Fm-3m |
| Zn$_4$O(NDC) | Zn(NO$_3$)$_2$ · 4H$_2$O 0.066 mmol 14NDC 0.066 mmol | DMF ethanol | 90 | 90 | 90 | 41.5594 | 18.818 | 17.574 | aba2 |
| CdTDC | Cd(NO$_3$)$_2$ · 4H$_2$O 0.014 mmol thiophene 0.040 mmol DABCO 0.020 mmol | DMF H$_2$O | 90 | 90 | 90 | 12.173 | 10.485 | 7.33 | Pmma |
| IRMOF-2 | Zn(NO$_3$)$_2$ · 4H$_2$O 0.160 mmol o-Br-BDC 0.60 mmol | DEF | 90 | 90 | 90 | 25.772 | 25.772 | 25.772 | Fm-3m |
| IRMOF-3 | Zn(NO$_3$)$_2$ · 4H$_2$O 0.20 mmol H$_2$N-BDC 0.60 mmol | DEF ethanol | 90 | 90 | 90 | 25.747 | 25.747 | 25.747 | Fm-3m |
| IRMOF-4 | Zn(NO$_3$)$_2$ · 4H$_2$O 0.11 mmol [C$_3$H$_7$O]$_2$-BDC 0.48 mmol | DEF | 90 | 90 | 90 | 25.849 | 25.849 | 25.849 | Fm-3m |
| IRMOF-5 | Zn(NO$_3$)$_2$ · 4H$_2$O 0.13 mmol [C$_5$H$_{11}$O]$_2$-BDC 0.50 mmol | DEF | 90 | 90 | 90 | 12.882 | 12.882 | 12.882 | Pm-3m |
| IRMOF-6 | Zn(NO$_3$)$_2$ · 4H$_2$O 0.20 mmol [C$_2$H$_4$]-BDC 0.60 mmol | DEF | 90 | 90 | 90 | 25.842 | 25.842 | 25.842 | Fm-3m |
| IRMOF-7 | Zn(NO$_3$)$_2$ · 4H$_2$O 0.07 mmol 1,4NDC 0.20 mmol | DEF | 90 | 90 | 90 | 12.914 | 12.914 | 12.914 | Pm-3m |
| IRMOF-8 | Zn(NO$_3$)$_2$ · 4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$ · 4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$ · 4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$ · 4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$ · 4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$ · 4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$ · 4H$_2$O 0.17 mmol PDC 0.12 mmol | DEF | 90 | 90 | 90 | 34.381 | 34.381 | 34.381 | Fm-3m |

-continued

| MOF-n | Ingredients molar ratios M + L | Solvents | α | β | γ | a | b | c | Space Group |
|---|---|---|---|---|---|---|---|---|---|
| IRMOF-15 | $Zn(NO_3)_2 \cdot 4H_2O$ 0.063 mmol TPDC 0.025 mmol | DEF | 90 | 90 | 90 | 21.459 | 21.459 | 21.459 | Im-3m |
| IRMOF-16 | $Zn(NO_3)_2 \cdot 4H_2O$ 0.0126 mmol TPDC 0.05 mmol | DEF NMP | 90 | 90 | 90 | 21.49 | 21.49 | 21.49 | Pm-3m |
| DHBC-MOF | $Zn(NO_3)_2 \cdot 4H_2O$ 0.20 mmol DHBC 0.10 mmol | DMF i-Propanol | 90 | 90 | 120 | 25.9 | 25.9 | 6.8 | R-3 |

In the table above, the following abbreviations are used:

| | |
|---|---|
| ADC | Acetylene dicarboxylic acid |
| NDC | Naphtalene dicarboxylic acid |
| BDC | Benzene dicarboxylic acid |
| ATC | Adamantane tetracarboxylic acid |
| BTC | Benzene tricarboxylic acid |
| BTB | Benzene tribenzoate |
| MTB | Methane tetrabenzoate |
| ATB | Adamantane tetrabenzoate |
| ADB | Adamantane dibenzoate |
| BPDC | 4,4-Biphenyldicarboxylic acid |
| DHBC | 2,5-Dihydroxyterephthalic acid |

Examples for the synthesis of these materials as such can, for example, be found in: J. Am. Chem. Soc. 123 (2001) pp. 8241, or in Acc. Chem. Res. 31 (1998) pp. 474, which are fully encompassed within the content of the present application with respect to their respective content.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, by spray drying, by spray granulation, as well as by evaporation of the mother liquor at elevated temperature and/or in vacuo and concentrating of the solid. The material obtained in this step is typically a fine powder.

The separated framework materials, particularly MOF-5, may be mixed with inert adjuvants like, e.g., graphite, compounded, melted, extruded, co-extruded, pressed, spinned, foamed and/or granulated to form a shaped body or shaped bodies. Possible geometries of the shaped body or shaped bodies are, among others, pellets, pills, spheres, granulate, or extrudates such as strands.

Especially preferred are geometries of the shaped bodies which allow for for space saving geometries and forms of containers and gas storage systems and fuel cells, respectively.

In the context of the present invention, the term "shaped body" refers to any solid body that has at least a two-dimensional outer contour and extends to at least 0.02 mm in at least one direction in space. No other restrictions apply, i.e., the body may take any conceivable shape and may extend in any direction by any length so long as it extends to at least 0.02 mm in one direction. In a preferred embodiment, the shaped bodies do not extend to more than 50 mm and not to less than 0.02 mm in all directions. In a further preferred embodiment, this range is limited from 1.5 mm to 5 mm.

As far as the geometry of these shaped bodies is concerned, spherical or cylindrical bodies are preferred, as well as disk-shaped pellets or any other suitable geometry, such as honeycombs, meshes, hollow bodies, wire arrangements etc.

To form shaped bodies comprising the metallo-organic framework material comprising pores, several routes exist. Among them (i) molding the metallo-organic framework material alone or the metallo-organic framework material in combination with a binder and/or other components into a shaped body, for example by pelletizing;

(ii) applying the metallo-organic framework material onto a (porous) substrate, and (iii) supporting the metallo-organic framework material on a porous or non-porous substrate which is then molded into a shaped body;

are to be mentioned.

Although not limited with regard to the route to obtain shaped bodies comprising metallo-organic frameworks according to the present invention, the above-recited routes are preferred within the invention disclosed herein. Presently, zeolites are the most commonly used porous materials which are either molded into shaped bodies or applied onto a (porous) support.

For the step of preparing shaped bodies containing at least one metallo-organic framework material, all processes of molding a powder and/or crystallites together that are known to the expert are conceivable. Also, all processes of applying an active component, such as the metallo-organic framework material, onto a substrate are conceivable. Preparing shaped bodies by a process involving molding is described first, followed by a description of the process of applying said material onto a (porous) substrate.

In the context of the present invention, the term "molding" refers to any process known to the expert in the field by which a substance that does not fulfill the above-mentioned requirement of a shaped body, i.e. any powder, powdery substance, array of crystallites etc., can be formed into a shaped body that is stable under the conditions of its intended use.

While the step of molding at least one metallo-organic framework material into a shaped body is mandatory, the following steps are optional according to the present invention:

(I) the molding may be preceded by a step of mixing, (II) the molding may be preceded by a step of preparing a paste-like mass or a fluid containing the metallo-organic framework, for example by adding solvents, binders or other additional substances, (III) the molding may be followed by a step of finishing, in particular a step of drying.

The mandatory step of molding, shaping or forming may be achieved by any method known to expert to achieve agglomeration of a powder, a suspension or a paste-like mass. Such methods are described, for example, in Ullmann's Enzylopädie der Technischen Chemie, 4$^{th}$ Edition, Vol. 2, p. 313 et seq., 1972, whose respective content is incorporated into the present application by reference.

In general, the following main pathways can be discerned: (i) briquetting, i.e. mechanical pressing of the powdery material, with or without binders and/or other additives, (ii) granulating (pelletizing), i.e. compacting of moistened powdery materials by subjecting it to rotating movements, and (iii) sintering, i.e. subjecting the material to be compacted to a thermal treatment. The latter is somewhat limited for the material according to the invention due to the limited temperature stability of the organic materials (see discussion below).

Specifically, the molding step according to the invention is preferably performed by using at least one method selected from the following group: briquetting by piston presses, briquetting by roller pressing, binderless briquetting, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods.

The preferred processes of molding are those in which the molding is affected by extrusion in conventional extruders, for example such that result in extrudates having a diameter of, usually, from about 1 to about 10 mm, in particular from about 1.5 to about 5 mm. Such extrusion apparatuses are described, for example, in Ullmann's Enzylopädie der Technischen Chemie, 4$^{th}$ Edition, Vol. 2, p. 295 et seq., 1972. In addition to the use of an extruder, an extrusion press is preferably also used for molding.

The molding can be performed at elevated pressure (ranging from atmospheric pressure to several 100 bar), at elevated temperatures (ranging from room temperature to 300° C.) or in a protective atmosphere (noble gases, nitrogen or mixtures thereof). Any combinations of these conditions is possible as well.

The step of molding can be performed in the presence of binders and/or other additional substances that stabilize the materials to be agglomerated. As to the at least one optional binder, any material known to expert to promote adhesion between the particles to be molded together can be employed. A binder, an organic viscosity-enhancing compound and/or a liquid for converting the material into a paste can be added to the metallo-organic framework material, with the mixture being subsequently compacted in a mixing or kneading apparatus or an extruder. The resulting plastic material can then be molded, in particular using an extrusion press or an extruder, and the resulting moldings can then be subjected to the optional step (III) of finishing, for example drying.

A number of inorganic compounds can be used as binders. For example, according to U.S. Pat. No. 5,430,000, titanium dioxide or hydrated titanium dioxide is used as the binder. Examples of further prior art binders are:

hydrated alumina or other aluminum-containing binders (WO 94/29408);

mixtures of silicon and aluminum compounds (WO 94/13584);

silicon compounds (EP-A 0 592 050);

clay minerals (JP-A 03 037 156);

alkoxysilanes (EP-B 0 102 544);

amphiphilic substances;

graphite.

Other conceivable binders are in principle all compounds used to date for the purpose of achieving adhesion in powdery materials. Compounds, in particular oxides, of silicon, of aluminum, of boron, of phosphorus, of zirconium and/or of titanium are preferably used. Of particular interest as a binder is silica, where the $SiO_2$ may be introduced into the shaping step as a silica sol or in the form of tetraalkoxysilanes. Oxides of magnesium and of beryllium and clays, for example montmorillonites, kaolins, bentonites, halloysites, dickites, nacrites and anauxites, may furthermore be used as binders. Tetraalkoxysilanes are particularly used as binders in the present invention. Specific examples are tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxyaluminum, tetramethoxysilane and tetraethoxysilane being particularly preferred.

In addition, organic viscosity-enhancing substances and/or hydrophilic polymers, e.g. cellulose or polyacrylates may be used. The organic viscosity-enhancing substance used may likewise be any substance suitable for this purpose. Those preferred are organic, in particular hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions at all with regard to the optional liquid which may be used to create a paste-like substance, either for the optional step (I) of mixing or for the mandatory step of molding. In addition to water, alcohols may be used, provided that they are water-miscible. Accordingly, both monoalcohols of 1 to 4 carbon atoms and water-miscible polyhydric alcohols may be used. In particular, methanol, ethanol, propanol, n-butanol, isobutanol, tert-butanol and mixtures of two or more thereof are used.

Amines or amine-like compounds, for example tetraalkylammonium compounds or aminoalcohols, and carbonate-containing substances, such as calcium carbonate, may be used as further additives. Such further additives are described in EP-A 0 389 041, EP-A 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the metallo-organic framework intact, the shaped bodies are preferably not exposed to temperatures exceeding 300° C. However, studies show that heating/drying under the aforementioned mild conditions, in particular drying in vacuo, preferably well below 300° C. is sufficient to at least remove organic compounds out of the pores of the metallo-organic framework (see the references given with respect to metallo-organic frameworks above).

Generally, the conditions are adapted and chosen depending upon the additive substances used.

The order of addition of the components (optional solvent, binder, additives, material with a metallo-organic framework) is not critical. It is possible either to add first the binder, then, for example, the metallo-organic framework material and, if required, the additive and finally the mixture containing at least one alcohol and/or water or to interchange the order with respect to any of the aforementioned components.

As far as the optional step (I) of mixing is concerned, for example, of the material containing a metallo-organic framework and a binder and optionally further process materials (=additional materials), all methods known to the expert in the fields of materials processing and unit operations can be used. If the mixing occurs in the liquid phase, stirring is preferred, if the mass to be mixed is paste-like, kneading and/or extruding are preferred and if the components to be mixed are all in a solid, powdery state, mixing is preferred. The use of atomizers, sprayers, diffusers or nebulizers is conceivable as well if the state of the components to be used allows the use thereof. For paste-like and powder-like materials the use of static mixers, planetary mixers, mixers with rotating containers, pan mixers, pug mills, shearing-disk mixers, centrifugal mixers, sand mills, trough kneaders, internal mixers, internal mixers and continuous kneaders are preferred. It is explicitly included that a process of mixing may be sufficient to achieve the molding, i.e., that the steps of mixing and molding coincide.

The shaped body according to the invention is preferably characterized by at least one of the following properties:
(aa) it extends in at least one direction in space by at least 0.02 mm and that it does not extend in any direction in space by more than 50 mm;
(bb) it is pellet shaped and has a diameter in the range from 1.5 mm to 5 mm and a height in the range from 1 mm to 5 mm;
(cc) it has a resistance to pressure (crush strength) in the range from 2 N to 100 N.

As a second principal pathway for producing shaped bodies containing at least one metallo-organic framework material, applying said material to a substrate is part of the present invention. Preferably, the substrate is porous. In principle, all techniques for contacting said material with said substrate are conceivable. Specifically, all techniques used for contacting an active material with a porous substrate known from the preparation of catalysts are applicable.

The at least one method of contacting is selected from the group comprising impregnating with a fluid, soaking in a fluid, spraying, depositing from the liquid phase, depositing from gas phase (vapor deposition), precipitating, co-precipitating, dipping-techniques, coating.

As a porous substrate, each shaped body known to the expert can be used, given that the shaped body fulfills the general requirements concerning its geometry as specified in the present application, for example, in items (i) to (iii) above. Specifically, the porous substrate that will be contacted with the metallo-organic framework material can be selected from alumina, activated alumina, hydrated alumina, silica gels, silicates, diatomite, kaolin, magnesia, activated charcoal, titanium dioxide, and/or zeolites.

While porous substrates are preferred, contacting of the metallo-organic framework material with a non-porous body and/or a two-dimensional substrate are conceivable as well. In the case of applying the metallo-organic framework material onto a non-porous shaped body, shell structures comparable to shell catalysts are obtained. Such configurations, as well as monolithic embodiments, are explicitly included in the present invention, given that they contain at least one metallo-organic framework material.

Other embodiments customary in catalyst technologies such as application of an active substance in a washcoat and/or structuring the support in honeycombs or in channels or other skeleton-shapes are preferred.

In a further embodiment the metallo-organic framework material and/or the shaped body formed from the metallo-organic framework material is contacted with at least one capacity-enhancing agent selected from the group consisting of solvents, complexes, metals, metal hydrides, alanates, alloys, and mixtures of two or more thereof, such as embodiments of the above derived from Pd, Pt, Ni, Ti, and Ru as the metal.

Examples for said capacity-enhancing agent are occluded metal hydrides.

The containers according to the invention may be used at temperatures in the range of from 21 K to temperatures being equivalent to an internal pressure inside the container of 750 bar. Preferred temperature ranges are from 77 K to 400° C., preferably from −100° C. to +100° C., the range of from −70° C. to 70° C. being especially preferred.

According to yet another preferred embodiment of the present invention, the container comprises at least one means for transferring the at least one gas savely and easily into the container and/or transferring the at least one gas savely and easily out from the container. This means may be, for example, a coupling which is part of the at least one opening of the inventive container and which is, at the same time, the gas-tight mechanism of the inventive container. Hence, this means may be capable of keeping the at least one gas savely inside the container and furthermore capable of releasing the at least one gas savely from the container. According to an even more preferred embodiment, this coupling provides for a clean and hermitical transfer of the at least one gas into and out from the inventive container without the risk of spilling the at least one gas. According to the aforementioned preferred embodiment according to which the at least one gas is transferred from a storage system to another storage system or from a storage system to a fuel cell as it is the case, for example, with a gas station, this coupling provides for a save, clean, easy-to-use, hermitical gas transfer from a road tanker to the gas station tanks or from a gas station tank to the fuel cell of a car, a truck, a motorbike or the like.

A storage system according to the invention may comprise one or more inventive containers. A fuel cell according to the invention may comprise one ore more containers or one or more storage systems. Each container comprised in the fuel cells and/or the storage systems may be equipped with separate means for transfering the gas into the container, keeping the gas inside the container and/or releasing the gas from the container. According to another embodiment, two or more containers may be suitably connected by at least one connecting means so that only one means for transfering the gas into the plurality of connected containers, keeping the gas inside the plurality of connected containers and/or releasing the gas from the plurality of connected container is necessary.

The invention is now further described by way of the following examples which are not meant to limit the scope of the present invention.

EXAMPLE 1

Preparation of MOF-5

| Starting Material | Molar Amount | Calculated | Experimental |
|---|---|---|---|
| terephthalic acid | 12.3 mmol | 2.04 g | 2.04 g |
| zinc nitrate-tetra hydrate | 36.98 mmol | 9.67 g | 9.68 g |
| diethylformamide (Merck) | 2568.8 mmol | 282.2 g | 282.2 g |

The above-mentioned amounts of the starting materials were dissolved in a beaker in the order diethylformamide, terephthalic acid, and zinc nitrate. The resulting solution was introduced into two autoclaves (250 ml), having respectively inner walls which were covered by teflon.

The crystallization occurred at 105° C. within twenty hours. Subsequently, the orange solvent was decanted from the yellow crystals, said crystals were again covered by 20 ml dimethylformamide, the latter being again decanted. This procedure was repeated three times. Subsequently, 20 ml chloroform were poured onto the solid, which was washed and decanted by said solvent twice.

The crystals (14.4 g), which were still moist, were introduced into a vacuum device and first at room temperature in vacuo ($10^{-4}$ mbar), subsequently dried at 120° C.

Subsequently, the resulting product was characterized by X-ray powder diffraction and an adsorptive determination of micropores. The resulting product shows an X-ray diffractogramm which coincides with MOF-5.

The determination of the sorption isotherm with argon (87 K; Micromeritics ASAP 2010) shows an isotherm of type I, being typical for microporous materials, and having a specific surface area of 3020 $m^2/g$, calculated according to Langmuir, and a micropore volume of 0.97 ml/g (at a relative pressure $p/p^0=0.4$).

EXAMPLE 2

Comparative Example

In the discharge valve of an empty aluminum pressure gas bottle (volume of empty bottle: 2.0 l), a frit manufactured from a sintered metal was built in.

The discharge valve was screwed onto the bottle, opened, and the bottle was gas-free deflated by a slide vane rotary vacuum pump until the pressure was 0.01 mbar. The bottle was sealed and weighed. The total weight of the empty bottle was 3.95 kg.

By means of an externally applied gas supply, methane was connected to the bottle and pressed on with a pressure reducer via the opened discharge valve of the bottle. The weight of the bottle was determined as a function of the increasing methane pressure. The results are summarized in table 1.

EXAMPLE 3

In the discharge valve of an empty aluminum pressure gas bottle (volume of empty bottle: 2.16 l), a frit manufactured from a sintered metal was built in. 686 g of the powdery MOF-5 material produced according to example 1 were filled into the open bottle. The discharge valve was screwed onto the bottle, opened, and the bottle was gas-free deflated by a slide vane rotary vacuum pump until the pressure was 0.01 mbar. The bottle was sealed and weighed. The total weight of the bottle filled with MOF-5 material was 4.806 kg.

By means of an externally applied gas supply, methane was connected to the bottle and pressed on with a pressure reducer via the opened discharge valve of the bottle. The weight of the bottle was determined as a function of the increasing methane pressure. The results are summarized in table 1.

It is found that in the examined pressure range considerably more methane is stored in essentially the same volume of the container according to the invention, compared to the container according to the prior art.

TABLE 1

Comparison of the container according to the invention with the prior art container

| Pressure/bar | Example 2 Capacity/ ($g/l_{container}$) | Example 3 Capacity/ ($g/l_{container}$) | Capacity Ratio Ex. 3/Ex. 2 |
|---|---|---|---|
| 3 | 1.75 | 4.31 | 2.46 |
| 6 | 4.10 | 8.06 | 1.97 |
| 10 | 6.85 | 12.96 | 1.89 |
| 15 | 10.40 | 21.02 | 2.02 |
| 40 | 32.10 | 54.40 | 1.69 |
| 70 | 56.25 | 74.26 | 1.32 |
| 100 | 80.75 | 94.91 | 1.18 |

EXAMPLE 4

Comparative example

In the discharge valve of an empty aluminum pressure gas bottle (volume of empty bottle: 2.0 l), a frit manufactured from a sintered metal was built in.

The discharge valve was screwed onto the bottle, opened, and the bottle was gas-free deflated by a slide vane rotary vacuum pump until the pressure was 0.01 mbar. The bottle was sealed and weighed. The total weight of the empty bottle was 3.95 kg.

By means of an externally applied gas supply, hydrogen was connected to the bottle and pressed on with a pressure reducer via the opened discharge valve of the bottle. The weight of the bottle was determined as a function of the increasing hydrogen pressure. The results are summarized in table 1.

EXAMPLE 5

In the discharge valve of an empty aluminum pressure gas bottle (volume of empty bottle: 2.16 l), a frit manufactured from a sintered metal was built in. 686 g of the powdery MOF-5 material produced according to example 1 were filled into the open bottle. The discharge valve was screwed onto the bottle, opened, and the bottle was gas-free deflated by a slide vane rotary vacuum pump until the pressure was 0.01 mbar. The bottle was sealed and weighed. The total weight of the bottle filled with MOF-5 material was 4.806 kg.

By means of an externally applied gas supply, hydrogen was connected to the bottle and pressed on with a pressure reducer via the opened discharge valve of the bottle. The weight of the bottle was determined as a function of the increasing hydrogen pressure. The results are summarized in table 2.

It is found that in the examined pressure range more hydrogen is stored in essentially the same volume of the container according to the invention, compared to the container according to the prior art.

TABLE 2

Comparison of the container according to the invention with the prior art container

| Pressure/bar | Example 4 Capacity/ (g/l$_{container}$) | Example 5 Capacity/ (g/l$_{container}$) | Capacity Ratio Ex. 5/Ex. 4 |
|---|---|---|---|
| 3 | 0.23 | 0.30 | 1.30 |
| 10 | 0.83 | 0.95 | 1.14 |
| 19 | 1.57 | 1.75 | 1.11 |
| 30 | 2.45 | 2.75 | 1.12 |
| 51 | 4.07 | 4.40 | 1.08 |
| 69 | 5.51 | 6.05 | 1.10 |

The invention claimed is:

1. Container for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 40 to 70 bar inside the container, said container further comprising a metallo-organic framework material comprising pores and at least one metal ion and at least one at least bidentate organic compound which is bound to said metal ion, wherein the at least one metal ion is $Zn^{2+}$ and the at least one at least bidentate organic compound is benzenedicarboxylate or benzenetricarboxylate.

2. Container according to claim 1 wherein the gas is a hydrocarbon.

3. Container according to claim 1 wherein the metallo-organic framework material is contacted with at least one capacity-enhancing agent selected from the group consisting of solvents, complexes, metals, metal hydrides, alloys, and mixtures of two or more thereof.

4. Container according to claim 1 wherein the metallo-organic framework material exhibits a specific surface area of more than 20 m$^2$/g, determined via BET adsorption according to DIN 66131.

5. Storage system comprising at least one container according to claim 1.

6. Fuel cell, comprising at least one container according to claim 1.

7. Method comprising supplying power to stationary, mobile, or mobile portable applications using a fuel cell according to claim 6.

8. Method comprising supplying power to power plants, cars, trucks, busses, cordless tools, cell phones, or laptops using a fuel cell according to claim 6.

9. Method comprising transferring at least one gas from a storage system to a fuel cell, said storage system comprising at least one container according to claim 1.

10. Method according to claim 9 wherein the fuel cell comprises at least one container for uptaking, or storing, or releasing, or uptaking and storing, or up-taking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 40 to 70 bar inside the container, said container further comprising a metallo-organic framework material comprising pores and at least one metal ion and at least one at least bidentate organic compound which is bound to said metal ion, wherein the at least one metal ion is $Zn^{2+}$ and the at least one at least bidentate organic compound is benzenedicarboxylate or benzenetricarboxylate.

11. Method comprising uptaking, or storing, or releasing, or uptaking and storing, or uptaking and releasing, or storing and releasing, or uptaking, storing and releasing at least one gas using the container according to claim 1.

12. Method comprising using a metallo-organic framework material comprising pores and at least one metal ion and at least one at least bidentate organic compound which is coordinately bound to said metal ion, for uptaking, or storing, or releasing, or uptaking and storing, or uptaking and releasing, or storing and releasing, or uptaking, storing and releasing at least one gas in stationary, mobile, or mobile portable applications, said applications comprising a container according to claim 1.

13. Method according to claim 12 wherein the applications are power plants, cars, trucks, busses, cordless tools, cell phones, or laptops.

14. Container according to claim 1, which container has a non-cylindrical geometry.

15. Container according to claim 14 wherein the gas is a hydrocarbon.

16. Container according to claim 14 wherein the metallo-organic framework material is contacted with at least one capacity-enhancing agent selected from the group consisting of solvents, complexes, metals, metal hydrides, alloys, and mixtures of two or more thereof.

17. Container according to claim 14 wherein the metallo-organic framework material exhibits a specific surface area of more than 20 m$^2$/g, determined via BET adsorption according to DIN 66131.

18. Storage system comprising at least one container according to claim 14.

19. Fuel cell, comprising at least one container according to claim 14.

20. Method comprising supplying power to stationary, mobile, or mobile portable applications using a fuel cell according to claim 19.

21. Method comprising supplying power to power plants, cars, trucks, busses, cordless tools, cell phones, or laptops using a fuel cell according to claim 19.

22. Method comprising transferring at least one gas from a storage system to a fuel cell, said storage system comprising at least one container according to claim 14.

23. Method according to claim 22 wherein the fuel cell comprises at least one container having a non-cylindrical geometry for uptaking, or storing, or releasing, or uptaking and storing, or uptaking and releasing, or storing and releasing, or uptaking, storing and releasing at least one gas, comprising at least one opening for allowing the at least one gas to enter and exit or at least one opening for allowing the at least one gas to enter and at least one opening for allowing the at least one gas to exit said container, and a gas-tight mechanism capable of storing the at least one gas under a pressure of from 40 to 70 bar inside the container, said container further comprising a metallo-organic framework material comprising pores and at least one metal ion and at least one at least bidentate organic compound which is bound to said metal ion, wherein the at least one metal ion is $Zn^{2+}$ and the at least one at least bidentate organic compound is benzenedicarboxylate or benzenetricarboxylate.

24. Method comprising uptaking, or storing, or releasing, or uptaking and storing, or uptaking and releasing, or storing and releasing, or uptaking, storing and releasing at least one gas using the container according to claim 14.

25. Method comprising using a metallo-organic framework material comprising pores and at least one metal ion and at least one at least bidentate organic compound which is preferably coordinately bound to said metal ion, for uptaking, or storing, or releasing, or uptaking and storing, or uptaking and releasing, or storing and releasing, or uptaking, storing and releasing at least one gas in stationary, mobile, or mobile portable applications, said applications comprising a container according to claim 14.

26. Method according to claim 25 wherein the applications are power plants, cars, trucks, busses, cordless tools, cell phones, or laptops.

27. Container according to claim 2 wherein the hydrocarbon is methane.

28. Container according to claim 15 wherein the hydrocarbon is methane.

* * * * *